United States Patent

[11] 3,634,839

[72] Inventors: Theo N. Vassil, Flushing; Howard Pearson, New York, both of N.Y.
[21] Appl. No.: 711,952
[22] Filed: Mar. 11, 1968
[45] Patented: Jan. 11, 1972
[73] Assignee: American District Telegraph Company, Jersey City, N.J.

[54] METHOD AND APPARATUS FOR SUPPRESSING SPURIOUS ALARMS IN AN ELECTRICAL PROTECTION SYSTEM
23 Claims, 8 Drawing Figs.

[52] U.S. Cl. .................................................. 340/237 S, 250/214, 317/49, 340/228 R, 340/248 R, 340/258 C
[51] Int. Cl. ........................................................ G08b 29/00
[50] Field of Search ........................................... 340/213, 237, 248, 253, 228, 212, 412–414, 258 A, 258 B; 317/32, 38, 49; 250/206, 214, 218, 223, 219 ID

[56] References Cited

UNITED STATES PATENTS

| | | | |
|---|---|---|---|
| 2,767,393 | 10/1956 | Bagno | 340/258 |
| 2,794,974 | 6/1957 | Bagno et al. | 340/228.2 X |
| 3,331,065 | 7/1967 | McDonald | 340/258 |
| 2,678,433 | 5/1954 | Evans | 340/228 |
| 2,821,668 | 1/1958 | Austin | 317/49 |
| 2,824,297 | 2/1958 | Josias et al. | 340/253 |
| 2,877,453 | 3/1959 | Mendenhall, Jr. | 340/237 |
| 2,982,943 | 5/1961 | Isaacson et al. | 340/248 X |
| 3,120,758 | 2/1964 | Craddock et al. | 340/212 X |
| 3,339,195 | 8/1967 | Murley, Jr. | 250/223 X |

Primary Examiner—Donald J. Yusko
Assistant Examiner—Daniel Myer
Attorney—Charles B. Smith

ABSTRACT: A method and apparatus for suppressing spurious alarms in an electrical protection system resulting from gross changes in a particular ambient condition lesser changes in which are characteristic of a true alarm condition. In the method of the invention, an electrical signal is produced in response to changes in the ambient condition at the protected place, the signal having a magnitude proportional to the amount of change in the ambient condition. The magnitude of the electrical signal is measured and when it reaches a threshold alarm level it triggers an alarm signal. If the magnitude of the electrical signal at least equals a threshold false alarm level different from the threshold alarm level by a predetermined amount, the the alarm signal is suppressed.

The apparatus of the invention comprises a condition-sensing element arranged to detect the level of or changes in an ambient condition at a protected place and to produce an electrical signal proportional to the amount of the change. The electrical signal is applied to a first signal-responsive element which measures the signal and operates an alarm-signalling device when the electrical signal is above a threshold alarm value characteristic of a change or level in the ambient condition in turn characteristic of an alarm condition. The electrical signal is also applied to a second signal-responsive element which measures the signal and which is arranged to suppress operation of the alarm-signalling device if the electrical signal is at least at a threshold false alarm value differing from the threshold alarm value by a preselected amount.

FIG.1.
PRIOR ART
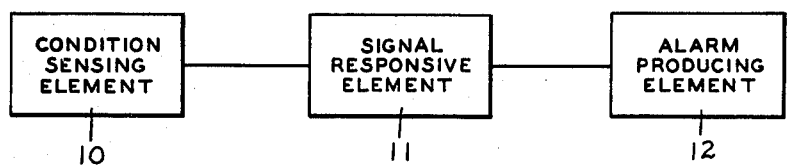
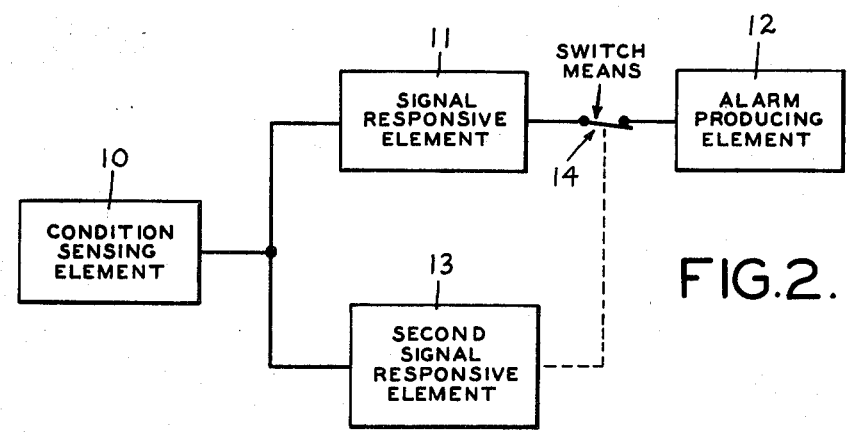
FIG.2.
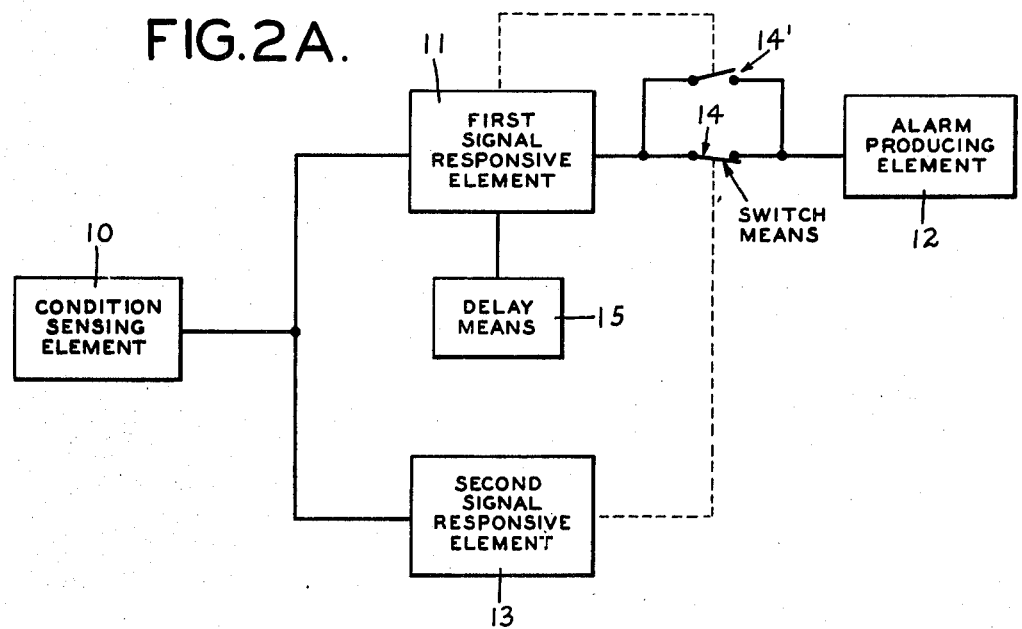
FIG.2A.

3,634,839

METHOD AND APPARATUS FOR SUPPRESSING SPURIOUS ALARMS IN AN ELECTRICAL PROTECTION SYSTEM

BACKGROUND OF THE INVENTION

Many electrical protection systems may be described as being comprised of three basic elements. The first is a condition-sensing element whose function is to detect a change in a condition being monitored and to produce an electrical signal which is representative of the condition. The second is a signal-responsive device which is capable of detecting a change of a predetermined magnitude in the electrical signal and which is arranged to actuate the third element, an alarm device, whose function is to produce a suitable alarm indication.

A typical example of such a protection system is a smoke detection system of the projected beam type in which a light source is employed to illuminate a remote photoelectric cell. The presence of a small quantity of smoke in the light beam causes a corresponding decrease in the amount of light falling on the cell and this small change in the cell output is detected and employed to actuate appropriate alarm indicating devices.

Practical experience with such systems has revealed that they are subject to false alarms when the light beam is interrupted by some means other than smoke. For instance, a workman carrying a ladder or other bulky object may inadvertently cause an interruption of the beam. Or, in the case of smoke detection systems installed in warehouses or stored rooms, boxes or other containers of merchandise may be piled up in such manner as to block the passage of the light beam. It will be evident that the problem arises from the occurrence of a large change in the sensing element output caused by the substantially complete blockage of the light beam in a system which is primarily intended to produce alarm signals upon a relatively small change in the sensing element output when the beam is only partially obscured by the presence of smoke. Efforts to protect the light beam by physical barriers comprised of guard rails or the like have proven both costly and unsightly.

Similar problems occur in other types of electrical protection systems. A good example is found in fire detection systems of the type which respond to an increase of the temperature of the protected area. While such systems are readily compensated to prevent the occurrence of false alarms caused by the gradual warming of the premises by the sun or by the operation of a central heating system, it is more difficult to guard against the effects of the relatively sudden application of a large amount of heat such as occurs when a furnace door is opened or a blower heater goes into operation.

Various means have been suggested for overcoming the problem caused by operation of concentrated heat sources. For example, U.S. Pat. No. 2,678,433, issued to F. C. Evans on May 11, 1954, illustrates a means for compensating a heat detection system against the effect of a blower heater consisting of the generation of an electrical signal which opposes the signal that ordinarily would result in an alarm indication. While considerable success has been achieved in using this type of compensating system, it has not been entirely satisfactory. One major problem in this regard has been the relatively high cost of the required extra temperature-sensing devices. Another problem has been difficulty in effecting proper compensation.

Another example of an electrical protection system which is subject to spurious alarms from gross changes in a measured ambient condition is the capacity alarm system illustrated in U.S. Pat. No. 2,455,376, issued to M. H. A. Lindsay on Dec. 7, 1948. In this system the approach of an intruder to an antenna is detected by the resulting variation in the electrostatic capacitance between the antenna and ground. The capacitance change produced by a human body is small in relation to that caused by a large object such as a motor truck even though the truck may be at a greater distance. Consequently, passing vehicles are often the cause of false alarm indications in such protection systems.

The principal object of the present invention has been the provision of a novel and improved method of and apparatus for suppressing spurious alarms in an electrical protection system.

More particularly, it has been an object of the invention to provide a method and apparatus whereby electrical protection systems may be made largely or entirely immune to large changes in the condition being monitored while remaining responsive to small variations in that condition.

Another object of the invention has been the provision of such a method and apparatus in which large changes in the condition being monitored are used to transmit a trouble or supervisory signal.

In the usual projected beam photoelectric smoke detection systems, it has been the custom to test such systems by means of "transparencies" which comprise a graduated set of translucent panels, each calibrated to pass only a certain percentage of an incident light beam. Thus if such a panel which allows 95 percent of the light to pass is inserted in the beam and the system fails to respond but subsequently does respond when a 90-percent panel is employed, the system is then known to be sensitive to a decrease in light of somewhere between 5 and 10 percent. A closer evaluation may, of course, be obtained through the use of transparencies having finer gradations. The percentage value at which an alarm occurs is known as the cutoff value. An important feature of the invention has been the provision of novel means for testing the operability and sensitivity of response of an installed smoke detection system of the projected beam type.

Other and further objects, features and advantages of the invention will be apparent from the following description of the invention.

SUMMARY OF THE INVENTION

The invention is applicable to electrical protection systems in which a relatively small change in an ambient condition is characteristic of an alarm situation while a relatively large change in that condition is characteristic of a nonalarm condition. The method of the invention comprises the steps of monitoring the ambient condition and producing an electrical signal proportional in magnitude to the level of or to changes in the condition, making a first measurement of the magnitude of the electrical signal and producing an alarm signal indication when the magnitude of the electrical signal reaches a value characteristic of an alarm level of the ambient condition, and simultaneously making a second measurement of the magnitude of the electrical signal and suppressing said alarm signal indication if the magnitude of the electrical signal is at a value characteristic of a gross by nonalarm level of the ambient condition.

The apparatus of the invention comprises a condition-sensing element located in the protected place and arranged to produce an electrical signal whose magnitude is proportional to a change in the ambient condition being sensed, first and second signal-responsive elements coupled to the condition-sensing element, the first signal-responsive element being arranged to operate at a first level of the electrical signal characteristic of an alarm condition change in the ambient condition, the second signal-responsive element being arranged to operate at a second level of the electrical signal characteristic of a gross but nonalarm condition change in the ambient condition, means responsive to operation of the first signal-responsive means to produce an alarm signal indication, and means responsive to operation of the second signal-responsive means to suppress production of the alarm signal indication.

BRIEF DESCRIPTION OF THE DRAWINGS

The invention will now be described in greater detail with reference to the appended drawings in which:

FIG. 1 is a block diagram of a typical electrical protection system of the type in which the invention is applicable;

FIGS. 2 and 2A are block diagrams of electrical protection systems embodying the invention;

DETAILED DESCRIPTION OF THE INVENTION

Figure 3:
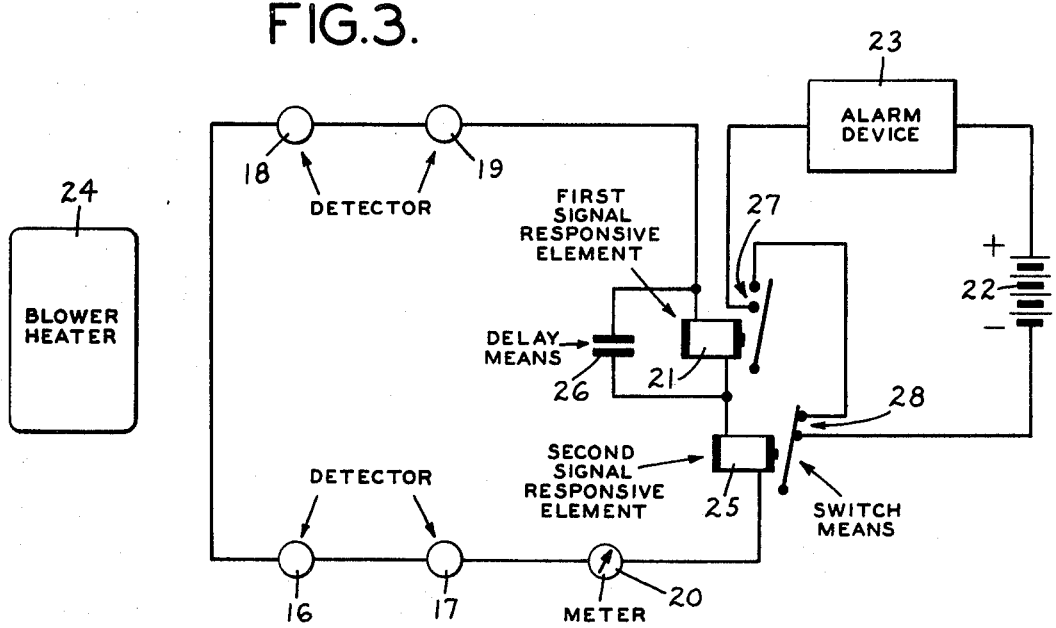
FIG. 3 is a combined block and circuit diagram of another electrical protection system embodying the invention.

Referring now to the drawings, there are shown in FIG. 1 the basic elements of an electrical protection system of the type to which the invention is applicable. The system illustrated in FIG. 1 comprises a condition-sensing element 10, a signal-responsive element 11 and an alarm-producing element 12.

The condition-sensing element is a monitoring device located at the protected premises and arranged to produce an electrical signal proportional in magnitude to the level of or to changes in an ambient condition at the protected premises, e.g., temperature, capacity to ground, and light transmittal properties of air. The electrical signal is supplied to the signal-responsive element 11 which is arranged to be operated when the electrical signal reaches a predetermined level. Usually the electrical signal will increase with increasing changes in the ambient condition but occasionally the reverse is true, in which case the signal-responsive element will operate at a low rather than a high value of electrical signal strength.

When the signal-responsive element is operated (on an increase or a decrease in electrical signal strength, as the case may be), alarm-producing element 12 will be operated. The alarm-producing element produces an alarm signal indication which may be of any suitable type. In local alarm systems a local bell or alarm lamp may be operated. In central station systems the alarm signal indication will be transmitted to a central station, usually over a wire line, to operate a central station drop, as is well known in the art.

The system shown in FIG. 1 will not distinguish between (1) a small change in the electrical signal resulting from a relatively small change in the ambient condition characteristic of an alarm condition and (2) a larger change in the electrical signal resulting from a relatively large change in the ambient condition characteristic of a nonalarm condition. Examples of these respective conditions have been given above, e.g., the small change in signal in a projected beam smoke detection system resulting from smoke in the air obscuring slightly the light beam and the large change in signal resulting from a complete blocking of the light beam.

Referring now to FIG. 2, it will be seen that the system of the invention does distinguish between the small and large changes in electrical signal. In FIG. 2 the condition-sensing element 10, the signal-responsive element 11 and the alarm-producing element 12 may be identical to the corresponding elements of FIG. 1. However, in FIG. 2 there is provided a second signal-responsive element 13 and switch means 14 controlled by the element 13.

The second signal-responsive element 13 has a faster but less sensitive responsive characteristic than the element 11. Thus a relatively small change in the electrical signal output of the condition-sensing element 10 will operate the element 11 but will not operate the element 13. A relatively large change in the electrical signal output of the condition-sensing element 10 will operate both elements 11 and 13. However, since element 13 has a faster response time than element 11, element 13 will operate before element 11 and hence will open switch 14 to prevent operation of alarm-producing element 12 when element 11 operates. In this way the alarm signal indication will be suppressed. It should be understood that operation of element 13 could conveniently disable element 11 rather than opening the circuit to element 12. Similarly, operation of element 13 could be used to disable element 12.

In addition to suppressing the alarm signal indication, operation of element 13 may be used to transmit a trouble or supervisory signal to indicate that while an alarm has not occurred, conditions are not normal.

If it should be desired to use signal-responsive elements, e.g., relays, having essentially equal response time characteristics, separate means may be used to delay operation of the first signal-responsive element for a sufficient time to allow the second signal-responsive element to operate. Such a system is shown in FIG. 2A with a delay means 15, which might be a capacitor coupled across the relay coil, shown acting on first signal-responsive element 11.

In a central station connected system, once an alarm signal is transmitted the alarm will be locked in and will be responded to in appropriate manner. Hence operation of the second signal-responsive element 13 after transmission of an alarm will not cancel the alarm. Should it be desired to lock in an alarm in a local system after element 11 is operated and element 13 is not operated, switch contacts may be provided to shunt out the disabling contacts actuated by element 13. In FIG. 2A normally open contacts 14' operated by element 11 will lock in the alarm when element 11 operates.

FIG. 3 illustrates a practical application of the system of the invention to a fire alarm system of the type shown in FIG. 2 of the aforementioned Evans patent. The circuit of that patent comprised four thermopile-type detectors 16, 17, 18 and 19 connected in series with a compensating device (omitted in FIG. 3 hereof), a meter 20, and a relay 21. A heat condition caused the detectors to produce a potential which would operate the relay 21 (first signal-responsive element) and close the circuit connecting a battery 22 to an alarm device 23. The compensating device, not shown in FIG. 3 hereof, was connected in opposite polarity to the detectors so that if the heat detected by the system was caused by the blower heater 24, the output of the detectors would be opposed by the compensator output and the production of an alarm indication would thus have been avoided.

In accordance with the present invention, the compensating device is removed and replaced with a relay 25 (second signal-responsive element) which requires more current to operate than the first relay. The speed of response of the first relay 21 is retarded, as by a capacitor 26 connected in parallel with the winding thereof. Switch means comprising normally open contacts 27 and normally closed contacts 28 of the first and second relays 21 and 25, respectively, are inserted in alarm device circuit.

A heat condition representative of a fire in the premises causes the detectors (or one or more of them) to produce a moderate current flow that will, after a brief delay imposed by capacitor 26, operate the first relay 21 and thus connect the alarm device 23 to the battery 22. A heavier current flow, however, in response to operation of the blower heater will operate the second relay 25 first, i.e., before relay 21, thereby opening the alarm device circuit at contacts 28 so that subsequent operation of the first relay 21 will not result in actuation of the alarm device.

Figure 4:
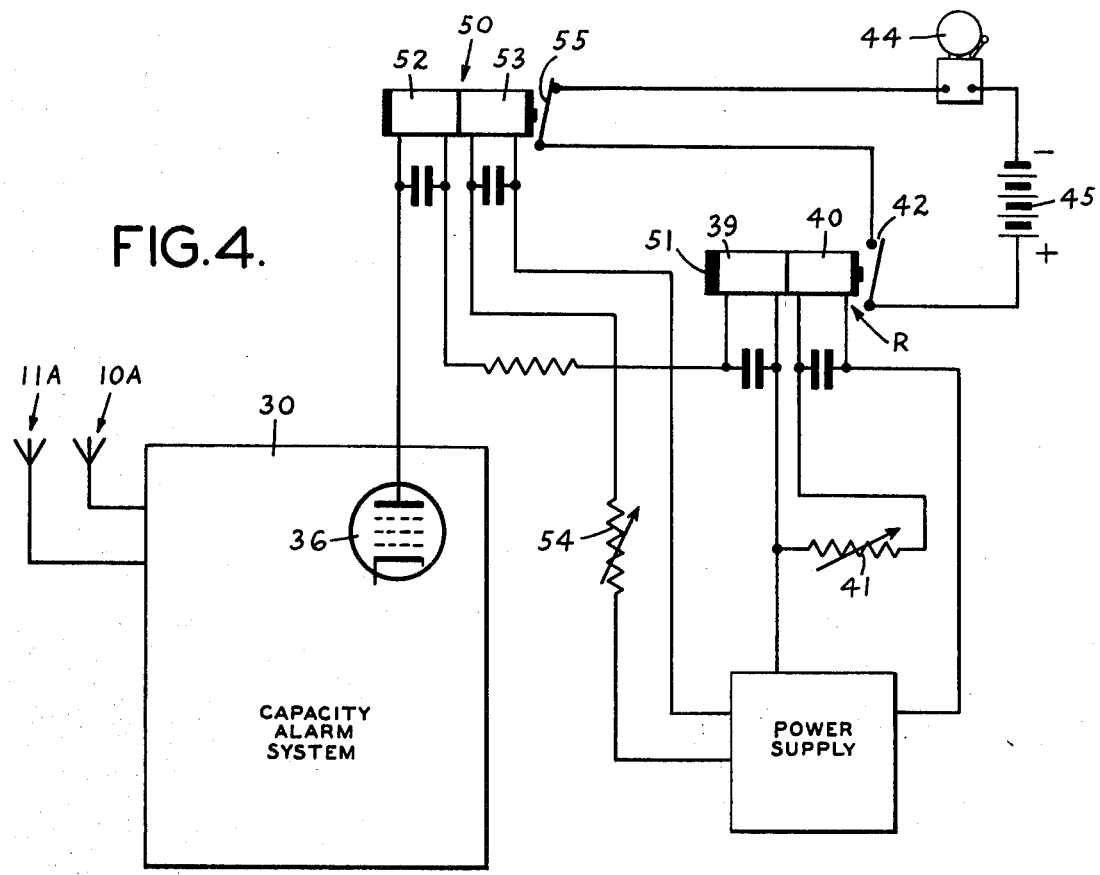
FIG. 4 is a schematic diagram of an electrical protection system embodying the invention.

Application of the principles of the invention to a capacity intruder alarm system of the type shown in the aforementioned Lindsay patent is illustrated in FIG. 4. In the Lindsay system there are provided two antennas, here designated 10A and 11A, connected to electronic circuitry, here shown as block 30, which cause the plate current of a pentode tube 36 to increase or decrease when the capacity to ground of one of the antennas is varied, as by the approach or departure of an intruder.

The plate current of tube 36 flows through winding 39 of a balanced relay R. Relay R has a second coil 40 which is supplied with current through a variable resistor 41 which is set to provide balanced current flows in coils 39 and 40 when the antennas are subject to steady state conditions. A slight increase or decrease in the plate current flow of tube 36 will actuate relay R and close normally open contacts 42 thereof, in turn completing a circuit through a bell 44 and battery 45. Operation of the bell 44 signals an alarm. As is well known in the art, the bell 44 may be replaced with a transmitting circuit or device to signal an alarm at a remote central station.

With the capacity alarm system set to respond to the approach of a person to one of the antennas, a much larger capacity change caused by a vehicle passing at some distance may result in a spurious alarm. Such a larger capacity change will result in a larger change in the plate current of tube 36. In order to avoid a spurious alarm under such conditions, a second balanced relay 50 is provided and coil 39 of relay R is made slow-to-operate, as by use of a copper slug indicated by the heavy line 51. Relay 50 has a coil 52 connected in series between the plate of tube 36 and coil 39 and a coil 53 supplied with current from the power supply through a variable resistor 54. Normally closed contacts 55 of relay 50 are connected in series between contacts 42 and bell 44 so as to prevent energization of the latter when relay 50 operates.

Relay 50 is made relatively insensitive to the minor changes in plate current flow caused by an intruder and which will operate relay R. However, a larger change in plate current flow such as is characteristic of the passing of a vehicle will operate relay 50 and cause contacts 55 to open preventing signalling of an alarm.

When the change in capacity ceases, the electronic system will return to its steady state condition, the plate current of tube 36 will return to normal, and both relays R and 52 will drop out, i.e., return to their balanced conditions. Should relay R remain operated after relay 52 drops out, which would occur if an intruder were moving near one of the antennas after the passing vehicle has moved off, an alarm would be given. An additional set of normally open contacts (not shown) of relay R may shunt contacts 55 to lock in an alarm when relay R is operated.

Figure 5:
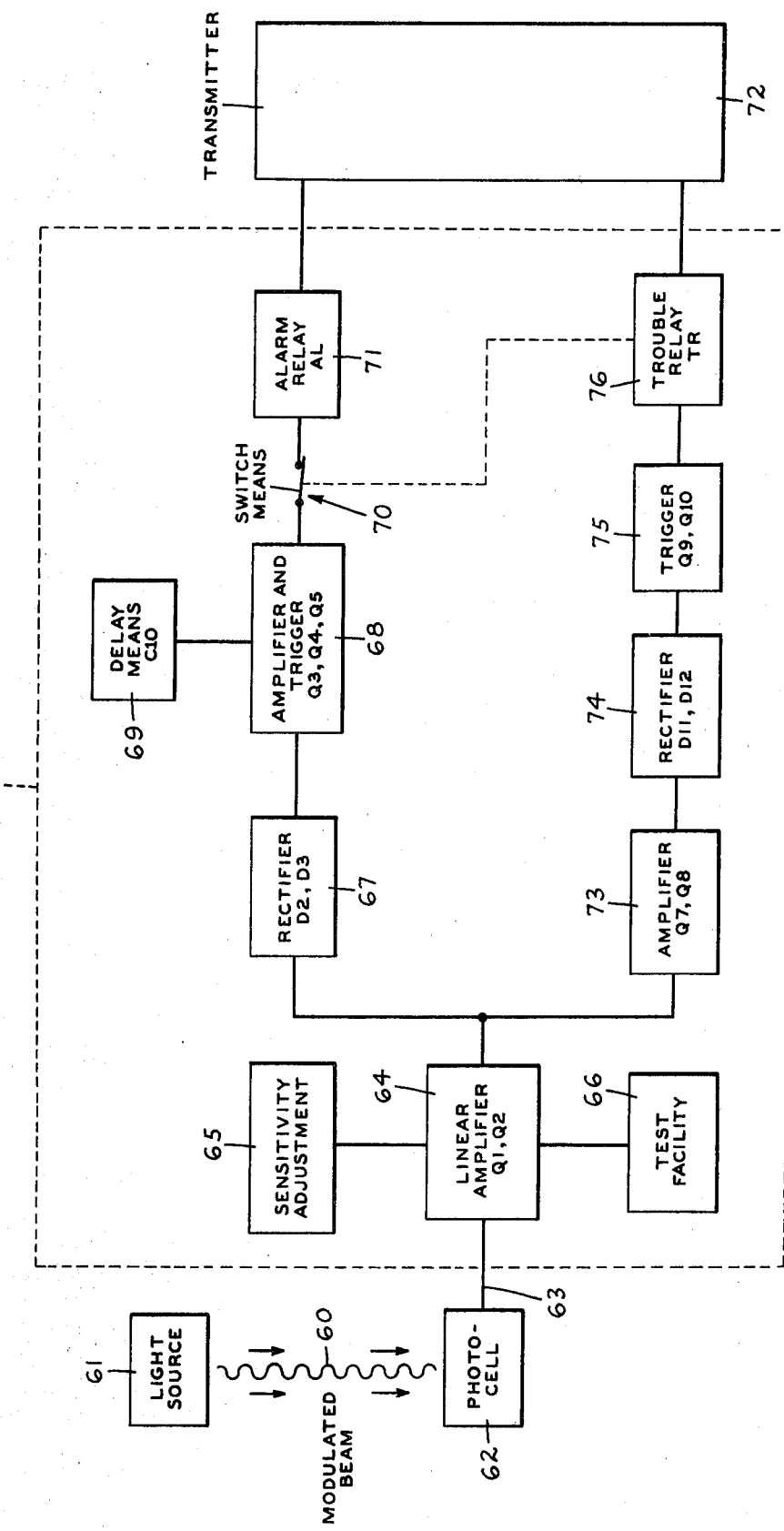
FIG. 5 is a block diagram of another electrical protection system embodying the invention.

The application of the invention to a modern sophisticated projected beam smoke detection system is indicated in block diagram form by FIG. 5. A light beam 60 is generated by a source 61 which might conveniently comprise an incandescent lamp electronically modulated at approximately 30 cycles per second and provided with a reflector and a lens suitable to produce a reasonably parallel beam of light. A receiver unit 62 consists of a photoconductive cell and a lens and mirror arrangement for concentrating the light beam on the cell. The receiver unit is connected to a separate control unit by a microphone cable 63.

The output of the cell is first amplified by an amplifier 64 specially designed to produce an output voltage which varies linearly over a given range with the changes in the intensity of the light received by the cell. The amplifier is also provided with means 65 for varying the output voltage and means 66 for reading that voltage. Consequently, when it is desired to test the operability and sensitivity of response of the system, a voltmeter is connected to the amplifier output. The output voltage is then reduced by means of a potentiometer until an alarm signal is produced. The reading of the voltmeter at this instant is compared to the original reading and the percentage decrease is noted. Since the amplifier output is linear with respect to the intensity of the light received, the percent of voltage decrease indicates the percentage decrease in light intensity required to produce an alarm. For example, if the original voltage reading was 1.0 volt and the alarm occurred when the voltage was reduced to 0.85 volt, the cutoff value in percent is given by 1.0 minus 0.85 multiplied by 100 or 15 percent. Means are also provided whereby the cutoff value may be readily adjusted thereby making the entire testing and adjusting procedure both simple and convenient in contrast with the prior procedure requiring the use of transparencies.

The linear amplifier output signal is applied to two channels each of which lead to a common transmitter or other means for producing suitable indications of the condition of the system as is well known in the art. The alarm channel comprises a rectifier 67, an amplifier and trigger unit 68 having means 69 to delay the response thereof, switch means 70 and an alarm relay 71 which controls the initiation of a transmitter 72.

The second or supervisory channel includes an amplifier 73, a rectifier 74, a trigger unit 75 and trouble relay 76 which also controls the initiation of the transmitter 72.

A relatively small decrease in the output of the linear amplifier 64 as would be caused by the presence of smoke in the projected light beam 60 will be passed through the alarm channel, after a slight delay, to the transmitter 72. On the other hand, a very substantial cutoff as would occur when the beam 60 is blocked by a solid object or a failure of the light source 61 will cause the supervisory channel to respond and operate the switch means 70 to prevent the occurrence of an alarm signal. Simultaneously a distinctive trouble signal indication will be initiated to warn supervisory personnel that an unusual, but nonalarm, condition exists.

Figure 6:
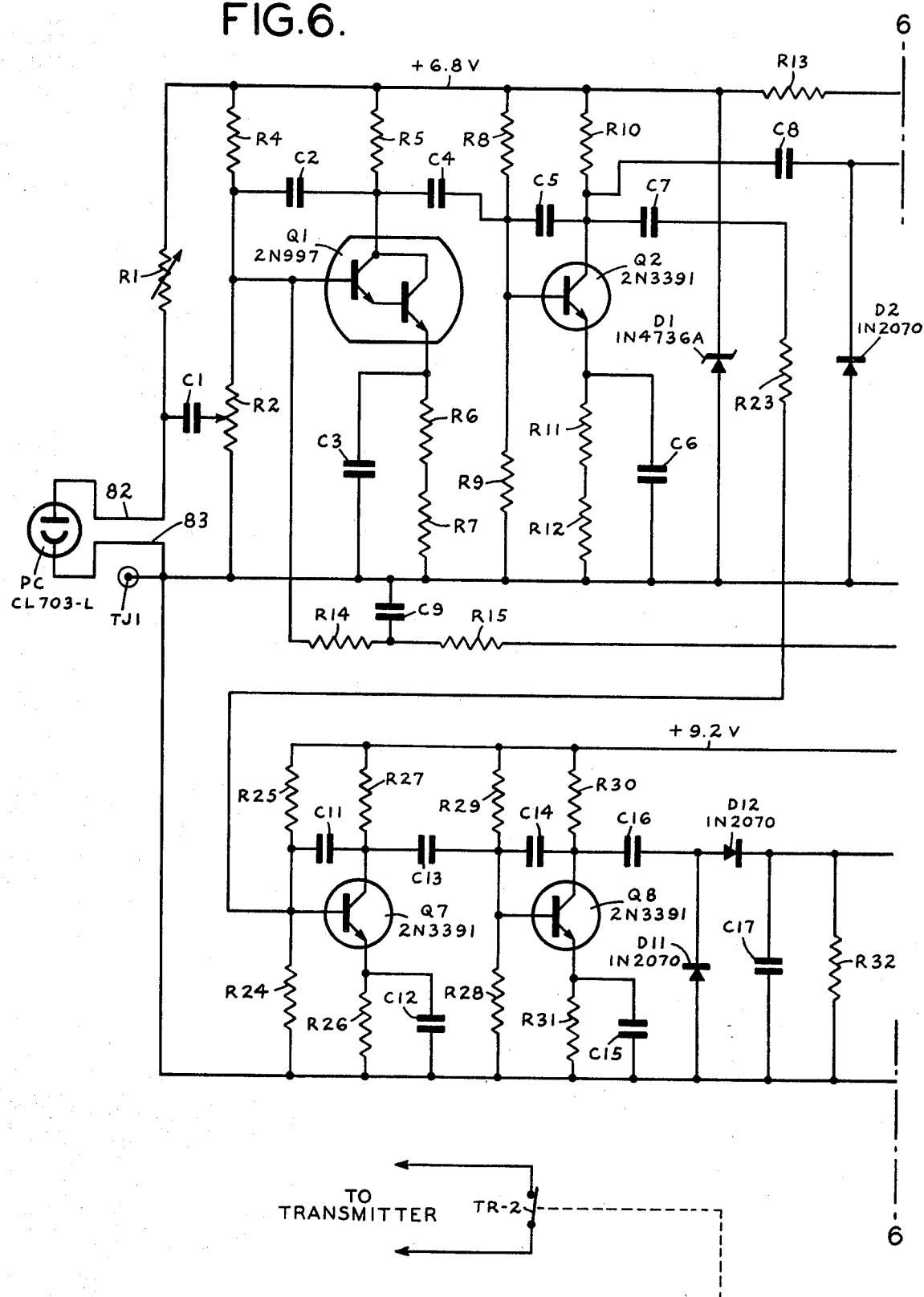
FIGS. 6 and 7, when joined along the line 6—6, are a circuit diagram of the embodiment of the invention shown in FIG. 5.
Figure 7:
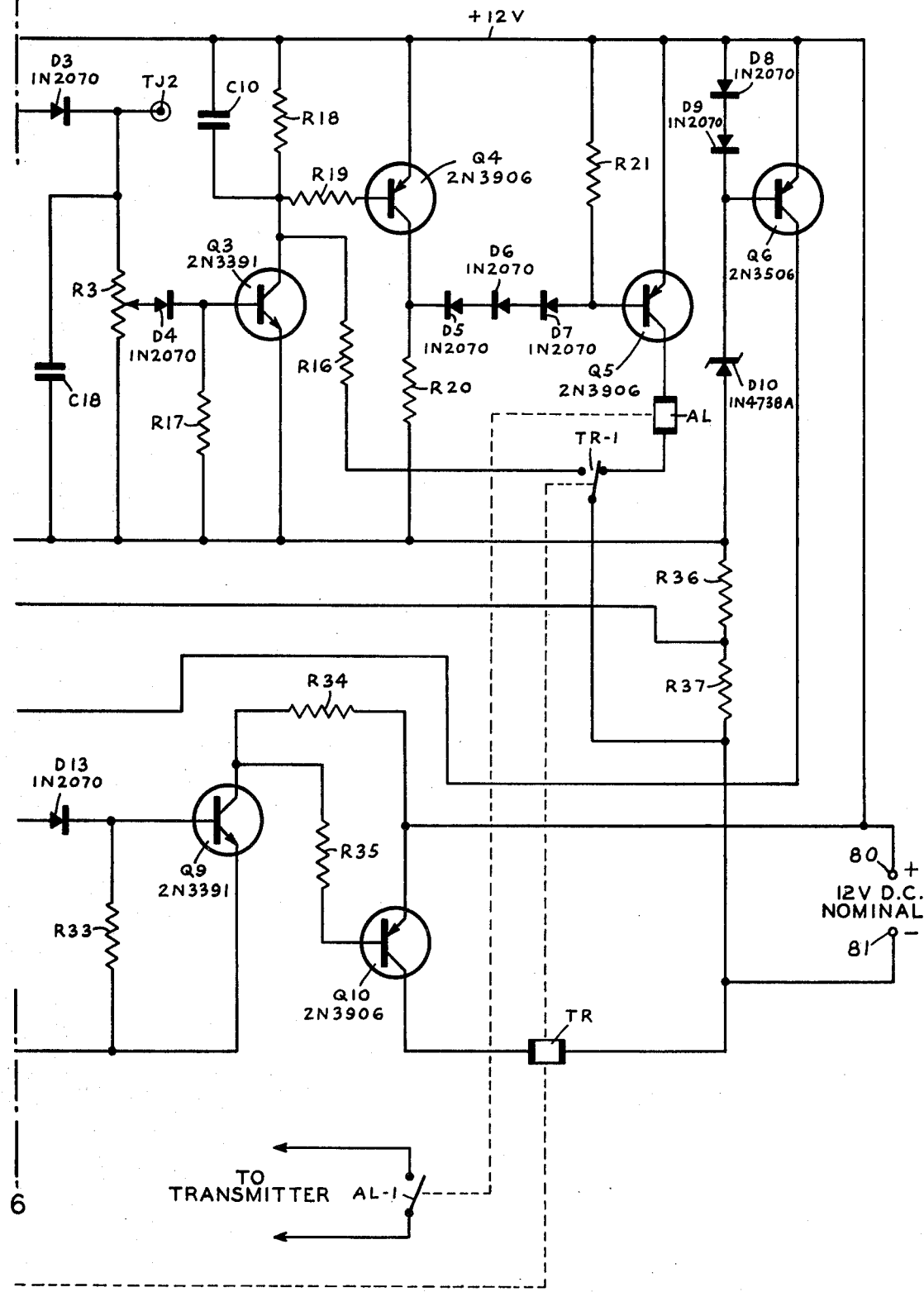

A specific embodiment of the foregoing system will now be described in conjunction with FIGS. 6 and 7. Power for the control unit is provided by a nominal 12-volt direct current source indicated at terminals 80 and 81. The supply voltage is reduced by means hereinafter explained to provide the particular values required for different portions of the circuit. The typical component values and operating voltages shown on the drawing and mentioned herein are for illustrative purposes only and should not be interpreted as limiting the scope of the present invention.

A light source (not shown) consisting of a small incandescent lamp is flashed by conventional solid-state circuitry at a rate of approximately 30 pulses per second. The light is received by a photoconductive cell PC which is connected to the control unit by microphone cable 82–83. The photocell PC is connected in series with a variable resistor R1 across the voltage supply. Resistor R1 is employed as an adjustment to obtain the maximum signal input to the control unit. The modulated portion of the input signals is coupled by a capacitor C1 and potentiometer R2 to the linear amplifier consisting of transistors Q1, Q2 and related components.

The linear amplifier is of the conventional capacity-coupled type and the coupling capacitors C1, C4, C8, the bypass capacitors C3, C6 and the feedback capacitors C2, C5 should be selected to provide maximum gain at approximately 30 cycles. The operating points of transistors Q1 and Q2 should be adjusted through the selection of the biasing resistors to provide good linearity within the operating range.

The 30-cycle output of transistor Q2 is split into two parts, one of which is directed to an alarm relay AL via a capacitor C8 and the other to a trouble relay TR via a capacitor C7. The capacitors C7 and C8 are both connected to the collector of transistor Q2.

The signal passing capacitor C8 is rectified by diodes D2, D3 and appears as a DC voltage across alarm trigger level control potentiometer R3. This DC voltage is linear with respect to the intensity of the light received by the photocell up to about 1.25 volts and for normal operating purposes is set at 1.0 volt by means of the input control potentiometer R2. Any reduction in the intensity of the light beam produces a corresponding reduction in the voltage across potentiometer R3 which is amplified by transistors Q3 and Q4 so that a small change at potentiometer R3 will be capable of causing transistor Q5 to become conductive and energize the alarm relay AL connected in series in the collector circuit of transistor Q5. A capacitor C10 connected between the collector of transistor Q3 and the positive supply conductor delays changes in the collector of transistor Q3 and in the base potential of transistor Q4 and hence acts to delay conduction of transistor Q5 when a drop in photocell illumination occurs. The delay may be of the order of one-third second.

When alarm relay AL operates, contacts AL-1 thereof will close to operate the transmitter (not shown) and initiate a distinctive alarm signal as is well known in the art. Diodes D5, D6 and D7, which are coupled in series between the collector of transistor Q4 and the base of transistor Q5 prevent the latter from conducting until the collector current of transistor Q4 reaches a threshold value. Changes in this collector current are delayed by the presence of capacitor C10.

The operation and sensitivity of the system may be readily tested by means of a voltmeter connected to jacks TJ1 and TJ2 which are connected to opposite ends of the winding of potentiometer R3. Thus, if it is desired to have the system respond to a 15 percent cutoff of the light beam, the trigger level control potentiometer R3 will have been adjusted so that a signal will be originated when the voltage across potentiometer R3 drops from the normal 1.0 volt to 0.85 volt, a reduction of 15 percent. Then, with the voltmeter reading the normal 1.0 volt, the system input voltage is reduced by means of potentiometer R2 until the voltmeter reads 0.85 volt at which point the system should respond. If necessary, suitable adjustments may be made by means of the potentiometers to obtain the desired operating point. The electrical method of testing the system presents obvious advantages over the transparencies of the prior art.

Capacitor C7 feeds a portion of the output of transistor Q2 through a resistor R23 to the two-stage amplifier consisting of transistors Q7, Q8. The coupling capacitors C7, C13, C16, bypass capacitors C12, C15, and feedback capacitors C11, C14 of this amplifier should be selected for maximum gain at 30 cycles per second but no provision need be made to achieve good linearity.

The output of transistor Q8 is rectified by diodes D11, D12 and appears as a DC voltage across a resistor R32 which biases transistor Q9 of the trigger to the normal conductive state. The collector of transistor Q9 is coupled to the base of transistor Q10 through a resistor R35. The output of transistor Q9 maintains transistor Q10 in the conductive state which in turn holds the trouble relay TR normally energized.

When the voltage across resistor R32 drops nearly to zero as would be caused by a substantial blockage of the light beam (95–98 percent cutoff), failure of the light source or loss of the modulations thereof, transistor Q9 becomes nonconductive. Transistor Q10, therefore, also becomes nonconductive and the trouble relay TR becomes deenergized. Front contact TR-1 of the trouble relay, which is in series with the winding of the alarm relay AL, opens to prevent the alarm relay from responding to a signal received via capacitor C8 after the expiration of the delay provided by capacitor C10 in the alarm trigger circuit. Back contact TR-1 also grounds the collector of transistor Q3 and allows capacitor C10 to charge through resistor R16. When the light beam is restored and the input signal voltage returns to normal, the abnormal voltage at the collector of transistor Q3 resulting from the relatively high charge on capacitor C10 prevents transistor Q3 from becoming conductive until the trouble relay TR has had time to restore and the normal charge has returned to capacitor C10.

Concurrently contact TR-2 of the trouble relay has opened to initiate a distinctive trouble or supervisory signal indication from the transmitter in the manner well known to the art.

The system is intended to be operated from a nominal 12-volt battery supply which may vary between 10.4 and 14.2 volts. Diodes D8, D9, D10 and resistors R36, R37, which are connected in series across the power supply, control the bias on transistor Q6 whose function is to supply a regulated 9.2 volts to the trouble signal amplifier Q7, Q8. If the battery voltage falls below 10 volts, Zener diode B10 stops conducting and the voltage supplied to transistors Q7, Q8 drops off very rapidly causing a trouble signal.

The Zener diode D1 regulates the voltage supplied to the linear amplifier Q1, Q2 at 6.8 volts.

The circuitry (not shown) that modulates the light source is also voltage regulated. However, since the light output varies as the b3.6 power of the voltage applied to the lamp, regulation of the voltage does not completely eliminate the variation of light with supply voltage. Consequently, the following means are provided to further compensate for voltage fluctuations when the light source and control unit share a common power supply. Since the voltage drops across diodes D8, D9, D10 will remain substantially constant within the normal range of supply voltage variations, any change in the supply voltage will appear across resistors R36, R37. A tap from the junction of these resistors applies a portion of the supply voltage variation to the base of transistors Q1 through the isolation network comprising resistors R14, R15 and capacitor C9.

The gain of transistor Q1 is thereby regulated to compensate for the changes in the light output caused by supply voltage variations.

Typical values for the resistors and capacitors of FIGS. 6 and 7, in ohms and microfarads, respectively, are given in the following table:

| Resistor | Value | Resistor | Value |
| --- | --- | --- | --- |
| R1 | 250,000 | R19 | 15,000 |
| (pot.)R2 | 25,000 | R20 | 4,700 |
| (Pot.)R3 | 5,000 | R21 | 10,000 |
| R4 | 75,000 | R23 | 9,100 |
| R5 | 9,100 | R24 | 10,000 |
| R6 | 500 | R25 | 82,000 |
| R7 | 470 | R26 | 1,000 |
| R8 | 39,000 | R27 | 9,100 |
| R9 | 10,000 | R28 | 10,000 |
| R10 | 4,700 | R29 | 82,000 |
| R11 | 500 | R30 | 9,100 |
| R12 | 470 | R31 | 1,000 |
| R13 | 150 | R32 | 4,700 |
| R14 | 120,000 | R33 | 47,000 |
| R15 | 120,000 | R34 | 15,000 |
| R16 | 2,700 | R35 | 5,600 |
| R17 | 47,000 | R36 | 27 |
| R18 | 15,000 | R37 | 47 |

| Capacitor | Value | Capacitor | Value |
| --- | --- | --- | --- |
| C1 | 1.0 | C10 | 22.0 |
| C2 | 0.01 | C11 | 0.22 |
| C3 | 100.0 | C12 | 50.0 |
| C4 | 4.7 | C13 | 10.0 |
| C5 | 0.01 | C14 | 0.22 |
| C6 | 300.0 | C15 | 10.0 |
| C7 | 10.0 | C16 | 4.7 |
| C8 | 50.0 | C17 | 47.0 |
| C9 | 10.0 | C18 | 4.7 |

Typical choices of transistor and diode types are indicated adjacent the respective transistors and diodes on the drawings. These types are only given as examples and should not be interpreted as limiting the scope of the invention.

While the invention has been described in connection with specific embodiments thereof and in specific uses, various modifications thereof will occur to those skilled in the art without departing from the spirit and scope of the invention as set forth in the appended claims.

What is claimed is:

1. The method of electrically protecting a place by monitoring the value of an ambient condition at said place and minimizing the occurrence of spurious alarms due to a variation in ambient condition resulting from occurrences of a condition other than an alarm condition, an alarm condition at said place producing a relatively small change in the value of said ambient condition and a particular nonalarm condition at said place producing a relatively large change in the value of said ambient condition, said method comprising the steps of:
   a. continuously monitoring the value of said ambient condition at said place and producing an electrical signal upon detection of a change in the value of said ambient condition, said electrical signal being proportional in value to the magnitude of the detected change and having a first threshold value characteristic of detection of said alarm condition at said place and a second and substantially higher threshold value characteristic of detection of said nonalarm condition at said place;
   b. separately and simultaneously making first and second measurements of the value of said electrical signal and separately detecting achievement of said first threshold value and said second threshold value;
   c. producing an alarm signal indication in response to detection of said first threshold value of said electrical signal a predetermined time interval after said electrical signal achieves said first threshold value; and d. suppressing production of said alarm signal indication prior to the production thereof in response to detection of said second threshold value of said electrical signal and maintaining suppression of said alarm signal indication so long as said second threshold value remains achieved irrespective of the time interval during which said second threshold value remains achieved.

2. The method set forth in claim 1 in which said step of making a second measurement of the value of said electrical signal and detecting achievement of said second threshold value is performed at a faster rate than said step of making a first measurement of the value of said electrical signal and detecting achievement of said first threshold value.

3. The method set forth in claim 1 in which said measuring and detecting steps are performed at substantially the same rate and delaying said step of producing an alarm signal for a predetermined time interval after detection of said first threshold value.

4. The method set forth in claim 1 in which said ambient condition is temperature, said alarm condition is fire and said nonalarm condition is a periodically operated heat source.

5. The method set forth in claim 1 in which said ambient condition is the light-beam-passing characteristic of a narrow, elongated volume of air, said alarm condition is smoke particles in said volume of air and said nonalarm condition is the presence of an opaque body substantially preventing the passage of a light beam along said volume of air.

6. The method set forth in claim 1 in which said ambient condition is capacity to ground, said alarm condition is motion of an intruder changing capacity to ground and said nonalarm condition is motion of a body having a much greater effect on capacity to ground than an intruder.

7. The method set forth in claim 1 comprising the additional step of producing a distinctive trouble signal indication in response to detection of said second threshold value.

8. The method of electrically protecting a place by monitoring the value of an ambient condition at said place and minimizing the occurrence of spurious alarms due to a variation in ambient condition resulting from occurrences of a condition other than an alarm condition, an alarm condition at said place producing a relatively small change in the value of said ambient condition and a particular nonalarm condition at said place producing a relatively large change in the value of said ambient condition, said ambient condition being the light-beam-passing characteristic of a narrow, elongated volume of air, said alarm condition being smoke particles in said volume of air and said nonalarm condition being the presence of an opaque body substantially preventing the passage of a light beam along said volume of air, said method comprising the steps of:

a. Continuously monitoring the value of said ambient condition at said place; passing a modulated light beam through said volume of air and impinging said light beam on a photocell located at one end of said volume and producing an electrical signal upon detection of a change in the value of said ambient condition, said electrical signal being proportional in value to the magnitude of the detected change and having a first threshold value characteristic of detection of said alarm condition at said place and a second threshold value characteristic of detection of said nonalarm condition at said place; said first threshold value of said electrical signal corresponding to the presence of a selected density of smoke particles in said beam, said second threshold value of said electrical signal having a magnitude substantially greater than the magnitude of said first threshold value and corresponding to substantial blockage of said beam;

b. separately and simultaneously making first and second measurements of the value of said electrical signal and separately detecting achievement of said first threshold value and said second threshold value;

c. producing an alarm signal indication in response to detection of said first threshold value of said electrical signal a predetermined time interval after said electrical signal achieves said first threshold value; and d. suppressing production of said alarm signal indication prior to the production thereof in response to detection of said second threshold value of said electrical signal.

9. Electrical protection apparatus for protecting a place by monitoring the value of an ambient condition at said place and minimizing the occurrence of spurious alarms, an alarm condition at said place producing a relatively small change in the value of said ambient condition and a particular nonalarm condition at said place producing a relatively large change in the value of said ambient condition, said apparatus comprising:

a. ambient-condition-sensing means located at the protected place and arranged to monitor the value of said ambient condition and to produce an electrical signal upon detection of a change in the value of said ambient condition, said electrical signal being proportional in value to the magnitude of the detected change, said electrical signal having a first threshold value characteristic of detection of said alarm condition at said place and a second and substantially higher threshold value characteristic of detection of said nonalarm condition at said place;

b. first and second signal-responsive elements arranged to operate, respectively, at said first and second threshold value of said electrical signal, said second signal-responsive element being arranged, upon application thereto of said electrical signal having a value equal to said second threshold value, to operate before said first signal-responsive element;

c. means intercoupling said condition-sensing means and said signal-responsive elements to apply said electrical signal to the latter;

d. alarm signal indication producing means coupled to said first signal-responsive element and arranged, upon operation of the latter, to produce an alarm signal indication; and e. means responsive to operation of said second signal-responsive means to suppress production of an alarm signal indication and to maintain suppression of an alarm signal indication so long as said electrical signal has a value equal to said second threshold value irrespective of the time interval during which said electrical signal has a value equal to said second threshold value.

10. Apparatus as set forth in claim 9 in which said second signal response element has a response time less than that of said first signal response element.

11. Apparatus as set forth in claim 9, comprising delay means coupled to said first signal-responsive element to delay operation thereof for a predetermined time interval after application thereto of said electrical signal having said first threshold value.

12. Apparatus as set forth in claim 9 in which said first and second signal-responsive elements each comprises an electronic trigger circuit and a relay arranged to have its condition changed in response to operation of the corresponding trigger circuit.

13. Apparatus as set forth in claim 12 in which a capacitive element is coupled to the electronic trigger circuit of said first signal-responsive means to delay operation thereof for a predetermined time interval after said electrical signal reaches said first threshold value.

14. A projected beam-type smoke detection system, comprising:

a. a source of a light beam;

b. a photocell physically spaced from said source and disposed in the path of said beam so that the output of said photocell is changed in response to changes in the intensity of the light impinging on said photocell;

c. an amplifier coupled to said photocell and arranged to produce an electrical signal which varies with changes in the intensity of light impinging on said photocell;

d. means coupled to the output of said amplifier and arranged to rectify said electrical signal to produce a first direct voltage which varies with the intensity of light impinging on said photocell;
e. a first trigger circuit coupled to said last-mentioned means and arranged to operate at a value of said first direct voltage corresponding to a first threshold value of said electrical signal;
f. alarm signal indication producing means coupled to said first trigger circuit and arranged upon operation of the latter to produce an alarm signal indication;
g. delay means arranged to delay production of said alarm signal indication for a predetermined time interval after said electrical signal reaches said first threshold value thereof;
h. an amplifier circuit having an input coupled to the output of said linear amplifier to amplify said electrical signal;
i. a rectifying circuit coupled to the output of said amplifier and arranged to produce a second direct voltage proportional in value to the value of said electrical signal;
j. a second trigger circuit coupled to said rectifying circuit and arranged to operate at a value of said second direct voltage corresponding to a second threshold value of said electrical signal, said second threshold value of said electrical signal, said second threshold value corresponding to a light intensity impinging on said photocell which is substantially less than the light intensity corresponding to said first threshold value; and
k. control means coupled to said second trigger circuit and arranged to be operated upon operation of said second trigger circuit, said control means having a control element arranged upon operation of said control means to prevent production of said alarm signal indication.

15. A projected beam-type smoke detection system, comprising:
a. a source of a modulated light beam;
b. a photocell physically spaced from said source and disposed in the path of said beam so that the output of said photocell is changed in response to changes in the intensity of the light impinging on said photocell;
c. a linear amplifier coupled to said photocell and arranged to produce an electrical signal which varies linearly over a working range with changes in the intensity of light impinging on said photocell;
d. a resistance element;
e. means coupled to the output of said linear amplifier and to said resistance element and arranged to rectify said electrical signal to produce across said resistance element a first direct voltage which varies linearly with the intensity of light impinging on said photocell;
f. means to amplify said first direct voltage;
g. a first electronic trigger circuit coupled to said last-mentioned amplifying means and arranged to operate at a value of said first direct voltage corresponding to a first threshold value of said electrical signal;
h. means to delay operation of said first trigger circuit for a predetermined time interval;
i. alarm signal indication producing means coupled to said first trigger circuit and arranged upon operation of the latter to produce an alarm signal indication;
j. an amplifier circuit having an input coupled to the output of said linear amplifier to amplify said electrical signal;
k. a rectifying circuit coupled to the output of said amplifier circuit and arranged to produce a second direct voltage proportional in value to the value of said electrical signal;
l. a second electronic trigger circuit coupled to said rectifying circuit and arranged to operate at a value of said second direct voltage corresponding to a second threshold value of said electrical signal, said second threshold value corresponding to a light intensity impinging on said photocell which is substantially less than the light intensity corresponding to said first threshold value; and
m. control means coupled to said second trigger circuit and arranged to be operated upon operation of said second trigger circuit, said control means having a control element arranged upon operation of said control means to prevent production of said alarm signal indication.

16. A projected beam-type smoke detection system, comprising:
a. a source of a modulated light beam;
b. a photocell physically spaced from said source and disposed in the path of said beam so that the output of said photocell is changed in response to changes in the intensity of the light impinging on said photocell;
c. a linear amplifier coupled to said photocell and arranged to produce an electrical signal which varies linearly over a working range with changes in the intensity of light impinging on said photocell;
d. a first manually adjustable variable resistance element;
e. means coupled to the output of said linear amplifier and to said first resistance element and arranged to rectify said electrical signal to produce across said first resistance element a first direct voltage which varies linearly with the intensity of light impinging on said photocell;
f. means to amplify said first direction voltage;
g. a first trigger circuit coupled to said last-mentioned amplifying means and arranged to operate at a value of said first direct voltage corresponding to a first threshold value of said electrical signal;
h. means to delay operation of said trigger circuit for a predetermined time interval;
i. alarm signal indication producing means coupled to said trigger circuit and arranged upon operation of the latter to produce an alarm signal indication;
j. an amplifier circuit having an input coupled to the output of said linear amplifier to amplify said electrical signal;
k. a rectifying circuit coupled to the output of said amplifier circuit and arranged to produce a second direct voltage proportional in value to the value of said electrical signal;
l. a second trigger circuit coupled to said rectifying circuit and arranged to operate at a value of said second direct voltage corresponding to a second threshold value of said electrical signal, said second threshold value corresponding to a light intensity impinging on said photocell which is substantially less than the light intensity corresponding to said first threshold value;
m. control means coupled to said second trigger circuit and arranged to be operated upon operation of said second trigger circuit, said control means having a control element arranged upon operation of said control means to prevent production of said alarm signal indication; and
n. means including a secondary manually adjustable variable resistance element interposed between said photocell and the input to said linear amplifier to reduce the magnitude of said electrical signal by a controlled amount to simulate the presence of smoke in said light beam.

17. A system as set forth in claim 16 including means to measure the voltage across said first resistance element.

18. A system as set forth in claim 15 in which said control means includes a relay arranged to have the normal condition thereof changed upon operation of said second trigger circuit, said relay having front and back contacts one of which forms said control element and the other of which is operatively connected to said first trigger circuit and is arranged to prevent operation of the latter until said relay has been restored to its normal condition after said electrical signal rises above said second threshold value thereof.

19. A system as set forth in claim 15 comprising means operated by said control means and arranged to produce a distinctive trouble signal indication upon operation of said second trigger circuit.

20. A system as set forth in claim 19 comprising means response to a drop in system supply voltage below a predetermined level to operate said second trigger circuit and thereby produce said distinctive trouble signal.

21. A system as set forth in claim 15 in which said source and the remainder of said system share a common power supply and in which means are provided to vary the gain of said linear amplifier in a sense to compensate for changes in the intensity of said light beam resulting from changes in the power supply voltage.

22. A smoke detection method in which the incidence of spurious alarms is minimized, comprising the steps:
   a. passing a modulated light beam along a path in the place to be protected;
   b. impinging said light beam on a photocell device located at one end of said path to produce an electrical signal varying in magnitude with the intensity of the light impinging on said photocell device;
   c. amplifying said electrical signal to produce an amplified signal which varies linearly over a working range with changes in said electrical signal;
   d. rectifying said amplifier signal to produce a first direct voltage which varies linearly with the intensity of light impinging on said photocell;
   e. generating an alarm signal indication in response to said first direct voltage decreasing to a first threshold value corresponding to a diminution in the light intensity impinging on said photocell as the result of smoke particles of given density being in said beam;
   f. delaying generation of said alarm signal indication for a predetermined time interval after said direct voltage reaches said first threshold value;
   g. separately rectifying said amplifier signal to produce a second direct voltage which varies with the intensity of light impinging on said photocell;
   h. actuating an electronic trigger in response to said second direct voltage decreasing to a second threshold value corresponding to a diminution in the light intensity impinging on said photocell as a result of substantial blockage of said beam;
   i. suppressing production of said alarm signal indication in response to actuation of said electronic trigger; and
   j. generating a distinctive trouble signal indication in response to actuation of said electronic trigger.

23. In the method of claim 22, the additional steps of measuring the value of said first direct voltage, gradually decreasing the magnitude of said electrical signal, and observing the decrease in value of said first direct voltage between the value thereof before the magnitude of said direct voltage is reduced and the value thereof at which said alarm signal indication is produce as a measure of the sensitivity of said method.

* * * * *

UNITED STATES PATENT OFFICE
CERTIFICATE OF CORRECTION

Patent No. 3,634,839　　　　　　　　　Dated January 11, 1972

Inventor(s) Vassil et al.

It is certified that error appears in the above-identified patent and that said Letters Patent are hereby corrected as shown below:

Col. 2, line 50 - "by" should be -- but --;

Col. 7, line 64 - "b3.6" should be -- 3.6 --;

Col. 11, lines
　　　　25 & 26 - delete -- said second threshold value of said electrical signal, --;

Col. 12, line 52 - "secondary" should be -- second --;

"　　　line 73 - "response" should be -- responsive --;

Col. 13, line 8 - after "steps" insert -- of --;

Col. 14, line 24 - "produce" should be -- produced --.

Signed and sealed this 25th day of July 1972.

(SEAL)
Attest:

EDWARD M. FLETCHER, JR.　　　　ROBERT GOTTSCHALK
Attesting Officer　　　　　　　　Commissioner of Patents